United States Patent
Aoki et al.

(10) Patent No.: US 7,525,734 B2
(45) Date of Patent: Apr. 28, 2009

(54) DISPLAY APPARATUS FOR VEHICLE

(75) Inventors: Kunimitsu Aoki, Shizuoka (JP);
Yoshiyuki Furuya, Shizuoka (JP);
Hideaki Kageyama, Shizuoka (JP); Go Nakamura, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 11/193,383

(22) Filed: Aug. 1, 2005

(65) Prior Publication Data
US 2006/0028733 A1 Feb. 9, 2006

(30) Foreign Application Priority Data
Aug. 3, 2004 (JP) .............. 2004-226614

(51) Int. Cl.
*G02B 27/14* (2006.01)
*G09G 5/00* (2006.01)
(52) U.S. Cl. .......................... 359/631; 345/7
(58) Field of Classification Search ......... 359/630–634; 345/7–9
See application file for complete search history.

(56) References Cited

U.S. PATENT DOCUMENTS

| | | | | |
|---|---|---|---|---|
| 6,100,943 A | * | 8/2000 | Koide et al. ............ | 345/7 |
| 6,104,414 A | * | 8/2000 | Odryna et al. .......... | 345/536 |
| 6,580,562 B2 | * | 6/2003 | Aoki et al. ............. | 359/630 |
| 6,639,569 B2 | * | 10/2003 | Kearns et al. .......... | 345/7 |
| 2005/0040940 A1 | * | 2/2005 | Sonobe ................. | 359/630 |
| 2005/0195383 A1 | * | 9/2005 | Breed et al. ........... | 356/4.01 |

FOREIGN PATENT DOCUMENTS

| | | |
|---|---|---|
| DE | 100 46 019 A1 | 9/2000 |
| DE | 102 00 400 B4 | 1/2002 |
| EP | 0 686 865 B1 | 11/1998 |
| JP | 2002-205571 | 7/2002 |
| JP | 2003-237411 | 8/2003 |

\* cited by examiner

*Primary Examiner*—Alicia M Harrington
(74) *Attorney, Agent, or Firm*—Kratz, Quintos & Hanson, LLP

(57) ABSTRACT

A plate-shaped display device is partitioned into a meter display area and a HUD display area. Images displayed on the display device are visible on both front and rear surfaces of the display device. A direct image displayed on the meter display area is projected toward an eye range of a vehicle driver. A reflected image displayed on the HUD display area is firstly projected in a direction opposite to the eye range. Then, the reflected image is reflected at a magnifying mirror and a windshield, then finally projected toward the eye range.

2 Claims, 3 Drawing Sheets

DISPLAY APPARATUS FOR VEHICLE

BACKGROUND OF THE INVENTION

The priority application claims priority of Japanese Patent Application No. 2004-226614, which is hereby incorporated by reference.

1. Field of the Invention

This invention relates to a display apparatus to be mounted on a vehicle, and in particular, the display apparatus to project a combination of direct and reflected images toward an eye range of a vehicle driver. (Here, the eye range is defined as a range of a typical driver's eye position.)

2. Description of the Related Art

Recently, a display apparatus, in which an image of a second display device buried under an instrument panel is reflected to project toward a vehicle driver, has been mounted on a vehicle. The display apparatus also includes a first display device to display a vehicle speed, various alarms and the like for a vehicle driver as a meter. Namely, the display apparatus displays a combination of direct and reflected images to be seen within an eye range of a vehicle driver.

Incidentally, prior art documents concerning the present invention are, for example, JP-A, 2003-237411 and JP-A, 2002-205571.

The display apparatus described above needs first and second displays for displaying direct and reflected images toward the eye range. Therefore, there are problems that an increase of the number of components, an upsizing of a body, an increase of production cost, and the like of the display apparatus.

On the other hand, common displays today such as a TFT-LCD, a VFD (vacuum fluorescent display) and the like are known to display an image being visible on both front and rear surface thereof. However, only a front surface is currently used as a display surface.

Accordingly, the present invention focuses the ability of the display device to display an image being visible on both the front and rear surfaces of the display device, and an object of the present invention is to provide a display device to display the combination of the images with a single display device for reducing the number of components, miniaturizing the body, and reducing the production cost of the display apparatus.

SUMMARY OF THE INVENTION

In order to attain the object, according to the present invention, there is provided a display apparatus including:

a display device for displaying an image being visible on both front and rear surfaces thereof, whereby a first image to be displayed on a first area of the display device is directly projected toward a predetermined eye range, and a second image to be displayed on a second area of the display device, different from the first area, is at least reflected once before being projected toward the predetermined eye range.

According to the above, a display apparatus for displaying a combination of direct and reflected images can be constituted with only one display device.

Preferably, the display apparatus further includes an optical member disposed in the opposite direction to a direction of projecting the first image for reflecting the second image, last of all, toward the eye range.

According to the above, a space at a backside of the display device is used effectively, and a virtual image projected from the second display area is seen further from the predetermined eye range.

Preferably, the optical member projects the second image once toward a windshield of a vehicle for making the windshield reflect the second image, last of all, toward the predetermined eye range.

According to the above, the second image is projected toward the eye range via reflections of the optical member and the windshield.

Preferably, the display apparatus further includes a second image generator for generating an inversely distorted image to compensate a distortion caused by the reflections of the optical member and the windshield.

Preferably, one of the first and the second images is a generated image based on predetermined control signals, and the other is a view image around a vehicle taken by a vehicle on-board camera, said view image being substantially invisible to naked eyes.

According to the above, a vehicle driver can effectively see both vehicle data such as vehicle speed, various alarms, and the view image around the vehicle substantially invisible to naked eyes.

The above and other objects, features, and advantages of the present invention will be better understood when taken in connection with the accompanying drawings and description.

DESCRIPTION OF THE PREFERRED EMBODIMENTS

Embodiment of the Present Invention

Figure 1:
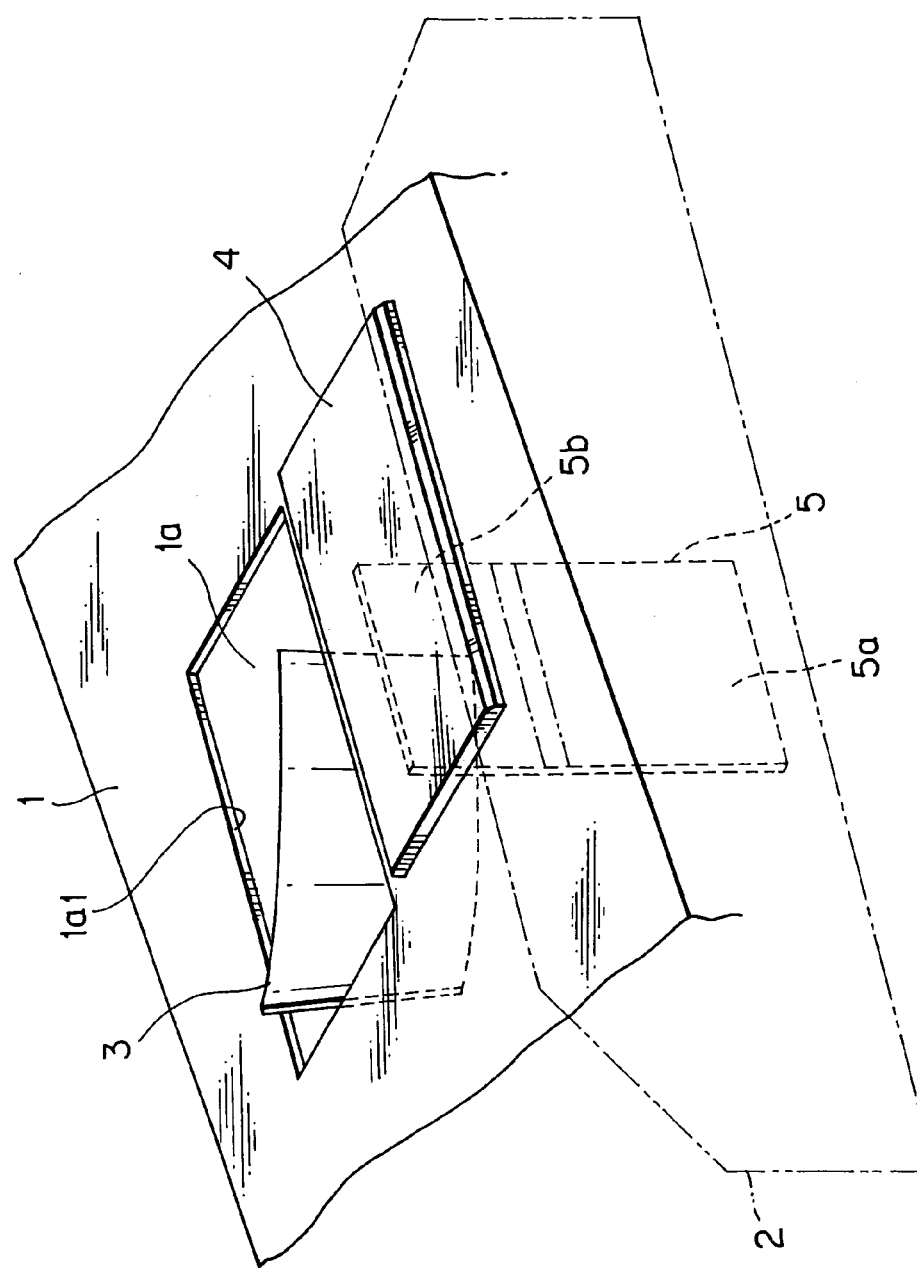
FIG. 1 is a schematic perspective view showing an embodiment of a display apparatus according to the present invention.
Figure 2:
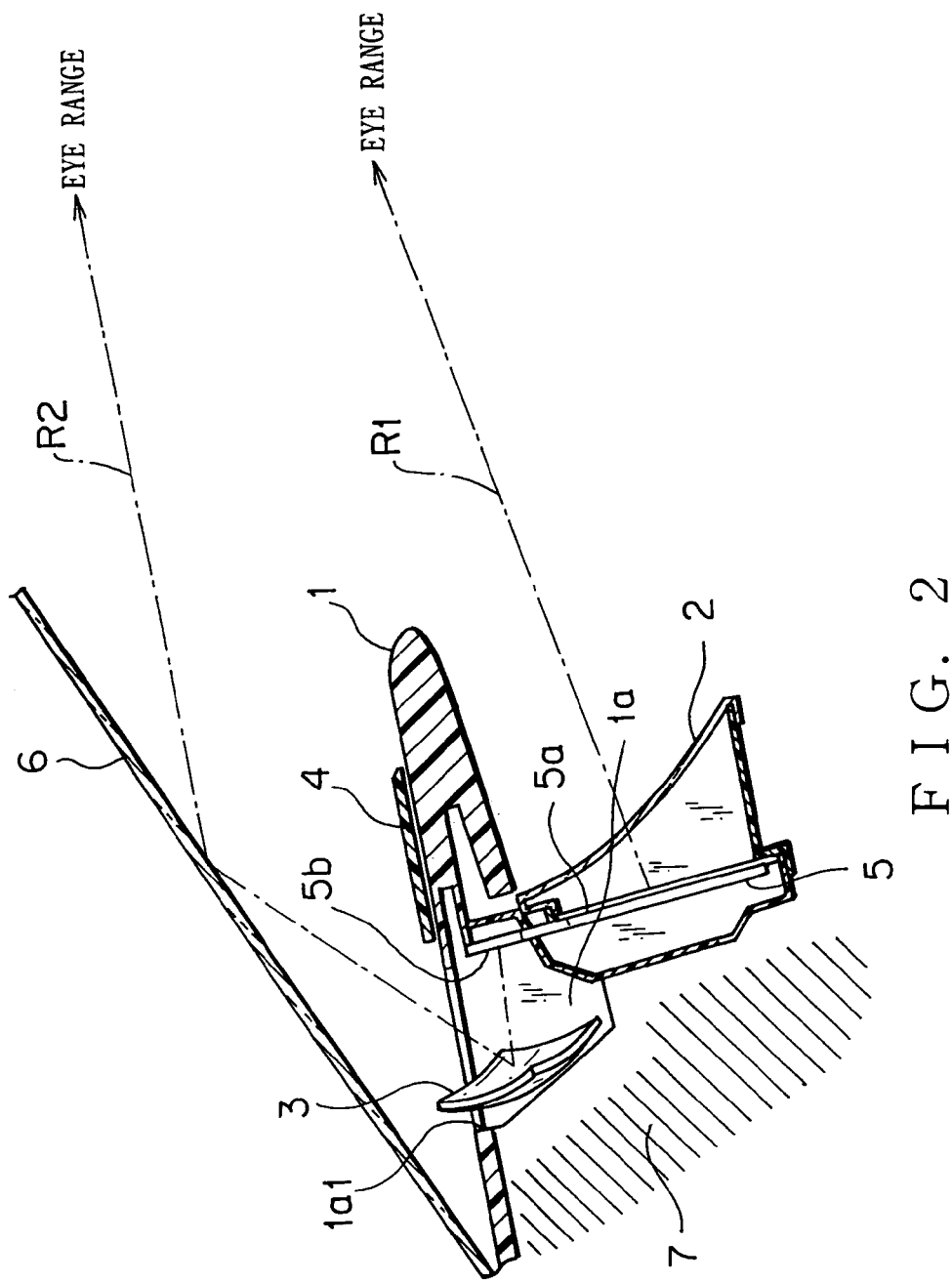
FIG. 2 is an explanatory view showing the embodiment of the display apparatus according to the present invention.

An embodiment of a display apparatus according to the present invention will be described below with reference to FIGS. 1 to 3. FIGS. 1 to 2 show the display apparatus in use. FIG. 2 is a cross-sectional view.

As shown in FIG. 2, in the display apparatus, a combination of a direct image R1 and a reflected image R2 projected from a single plate multi-display device 5 projects toward an eye range of a seated vehicle driver. An image can be seen on both front and rear surfaces of the display device 5, for example, a TFT-LCD or a VFD. Either a self-luminous device or a device with backlighting may be used for the display device 5.

As shown in FIGS. 1 and 2, the display device 5 is partitioned into a meter display area 5a (a first area) and an HUD display area 5b (a second area). Here, an image displayed on the meter display area 5a is projected toward an eye range ER as the direct image R1. An image displayed on the HUD display area 5b firstly is projected in a direction opposite to the eye range ER, then reflected at least once, and finally projected toward the eye range ER as the reflected image R2. Namely, whether the image is the direct image R1 or the reflected image R2 depends on an area where the image is displayed on the display device 5.

Some of common display devices essentially display an image on both front and rear surfaces without any additional processing. Therefore, the display apparatus of the present invention has a large merit of cost-reduction by using an existing display device as it is.

Various data such as the vehicle speed, revolutions per minute, and various alarms are displayed on the meter display area 5a as a first image. A view image around a vehicle taken by a vehicle on-board camera, said view image being substantially invisible to naked eyes, (for example, infrared image) is displayed on the HUD display area 5b as a second image. Incidentally, displayed contents are exchangeable between the first and second images. However, preferably, the view image around a vehicle, and substantially invisible to naked eyes is displayed on the HUD display area 5b.

As shown in FIGS. 1 and 2, on condition that the display device 5 is used as described above, an accommodation room 1a for accommodating a magnifying mirror 3 as an optical member and the like is embedded under an instrument panel 1 at a front side of a vehicle. Inner walls of the accommodation room 1a constitute a substantially flat box shape. An opening 1a1 is bored on an upper wall of the accommodation room 1a.

The magnifying mirror 3 has an aspherical surface depending on a shape of a windshield 6 and a physical relationship for making a vehicle driver look straight at the image on the HUD display area 5b. When in use, the magnifying mirror 3 is slightly tilted. The image on the HUD display area 5b is reflected by the magnifying mirror 3 and the windshield 6, and then projected toward the eye range ER as the reflected image R2.

A combination meter 2, in which a speedometer, a tachometer, and various alarms are integrated, is so disposed on the instrument panel 1 as to face the seated vehicle driver. In the meter 2, the image displayed on the meter display area 5a of the display device 5 is projected toward the eye range ER as the direct image R1.

A cover 4 of the instrument panel 1 is provided slidably at the opening 1a1 of the accommodation room 1a. A color of the cover 4 is the same as that of the instrument panel 1. A size of the cover 4 is substantially the same as that of the opening 1a1. The cover 4 has a flat plate shape. As shown in FIGS. 1 and 2, when the display apparatus is in use, the magnifying mirror 3 is partially projected from the opening 1a1. When the display apparatus is not in use, the magnifying mirror 3 is rotated downward, and a whole body of the magnifying mirror 3 is accommodated in the accommodation room 1a (not shown). The cover 4 is operated together with the rotation of the magnifying mirror 3. When the display apparatus is used, as shown in FIGS. 1 and 2, the opening 1a1 is fully opened. When the display apparatus is not used, the cover 4 covers the opening 1a1 and is flush with a wall of the instrument panel 1 (not shown).

Many members such as an air duct communicating with an air conditioner, a reinforcing member, and a wire harness are in a space 7 under the instrument panel 1.

Next, an electric constitution of the display apparatus according to the present invention will be described with reference to FIG. 3.

Figure 3:
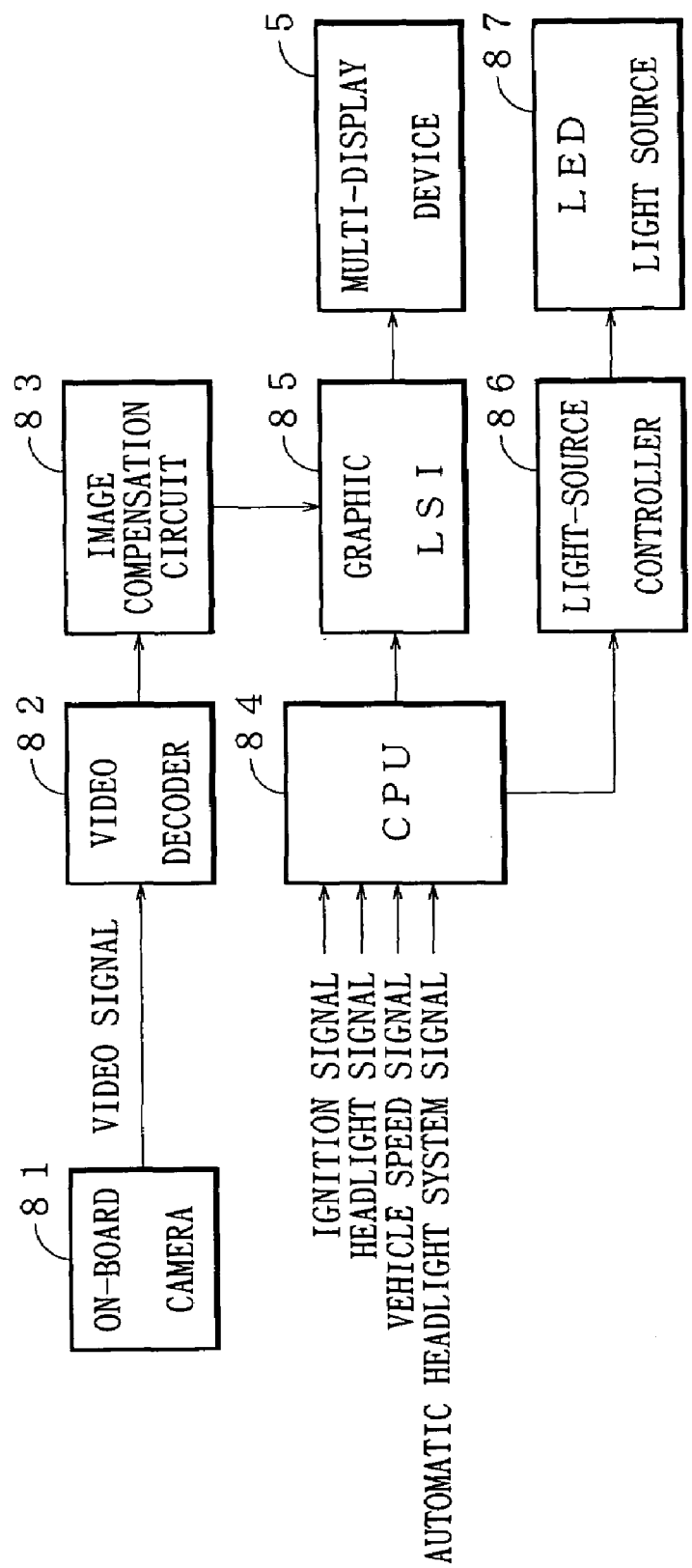
FIG. 3 is an electric block diagram showing the embodiment of the display apparatus according to the present invention.

As shown in FIG. 3, a view image around a vehicle taken by a vehicle on-board camera 81 and being invisible to naked eyes, such as an infrared image, is outputted as a video signal to a video decoder 82. The infrared image offers information about a human and the like around the vehicle being substantially invisible to the naked eyes at night, and thus improves vehicle safety. A signal from the video decoder 82 is once outputted to an image compensation circuit 83, and then outputted to a graphic LSI 85.

The image taken by the on-board camera 81 is assigned to the image displayed on the HUD display area 5b. This image is reflected by the magnifying mirror 3 and the windshield 6, then projected toward the eye range ER. Since the windshield 6 has an aspherical surface as is generally known, a shape and an arrangement of the magnifying mirror 3 is designed for compensating the asphericity and resultingly projecting a less distorted image toward the eye range ER.

The image originally projected from the HUD display area 5b is distorted by reflections on the magnifying mirror 3 and the windshield 6. The image compensation circuit 83 outputs a inversely distorted image for canceling the distortion on the image projected toward the eye range ER. The inversely distorted image is generated depending on the shapes and arrangements of the magnifying mirror 3 and the windshield 6. Suitable parameters for generating the inversely distorted image corresponding to the shapes and the arrangements are, for example, stored in a not-shown memory and selectively set in the image compensation circuit 83. Incidentally, a common method disclosed in the prior art document JP-A, 2002-205571 can be used for generating the inversely distorted image.

On the other hand, various control signals for such as an ignition, a headlight, a vehicle speed, an automatic headlight system and the like are given by a CPU 84. The CPU 84 outputs signals corresponding to the various control signals to the graphic LSI 85 for making the display device 5 display an image corresponding to the control signals. Further, the CPU 84 instructs a light-source controller 86 corresponding to the control signals to control an LED light-source 87 as a backlight. If the display device 5 is a self-luminous display, the commands the light-source controller 86 and the LED light-source 87 are not necessary.

The graphic LSI 85 as a second image generator receives the signal corresponding to the image to be displayed on the meter display area 5a from the CPU 84 and the signal corresponding to the image to be displayed on the HUD display area 5b from the image compensation circuit 83. Then, the graphic LSI 85 outputs images for displaying on the meter display area 5a and the HUD display area 5b. Incidentally, a common method disclosed in the prior art document JP-A, 2002-205571 can be used for outputting the images to be displayed.

According to the above, the display apparatus according to the present invention simultaneously projects both the direct image as a meter displaying such as vehicle speed and various alarms, and the reflected image displaying a view around the vehicle substantially invisible to naked eyes. Further, the distortion of the reflected image can be compensated corresponding to a vehicle type (including a windshield shape and an instrument panel layout). Therefore, a constitution of the display apparatus can be simplified. Further, safety and convenience of the display apparatus is improved.

According to the above, the display apparatus according to the present invention allows to reduce the number of components, miniaturize the body, and reduce the production cost of the display apparatus.

In the embodiment described above, the reflected image is reflected twice at the magnifying mirror 3 and the windshield 6. However, this invention is not limited to this. For example, the reflected image may be reflected once at the magnifying mirror 3 or the windshield 6.

Having now fully described the present invention, it will be apparent to one of ordinary skill in the art that many changes and modifications can be made thereto without departing from the scope of the invention as set forth herein.

What is claimed is:

1. A display apparatus comprising:
a multi-display device for displaying images being visible on both front and rear surfaces thereof, whereby
a first image to be displayed on one display on a first area of the multi-display device is directly projected toward a predetermined eye range, and
a second image to be displayed on another display on a second area of the multi-display device, different from the first area, is at least reflected once before being projected toward the predetermined eye range, wherein
one of the first and the second images is a generated image based on predetermined control signals,
the other is a view image around a vehicle taken by a vehicle on-board camera, said view image being substantially invisible to naked eyes,
the first and second areas are disposed on the same display panel,
the first image displayed on the one display on the first area on the front surface of the multi-display device is the same image as the first image displayed on the one display on the first area on the rear surface of the multi-display device, and
the second image displayed on the another display on the second area on the front surface of the multi-display device is the same image as the second image displayed on the another display of the second area on the rear surface of the multi-display device,
the display apparatus further comprising an optical member disposed in the opposite direction to a direction of projecting the first image for reflecting the second image, last of all, toward the predetermined eye range,
wherein the optical member projects the second image once toward a windshield of a vehicle and the second image is reflected by the windshield, last of all, toward the predetermined eye range.

2. The display apparatus as claimed in claim 1, further comprising a second image generator for generating an inversely distorted image to compensate a distortion caused by the reflections of the optical member and the windshield.

* * * * *